A. STUBER.
APPARATUS FOR REGISTERING THE FLOW OF LIQUID.
APPLICATION FILED NOV. 8, 1916

1,387,022.

Patented Aug. 9, 1921.

WITNESSES

INVENTOR
Adolph Stuber
BY
his ATTORNEYS

A. STUBER.
APPARATUS FOR REGISTERING THE FLOW OF LIQUID.
APPLICATION FILED NOV. 8, 1916
1,387,022. Patented Aug. 9, 1921.
2 SHEETS—SHEET 2.
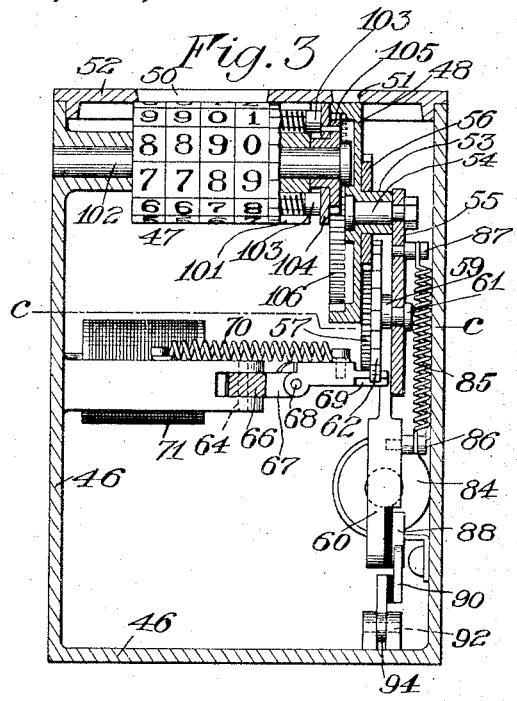
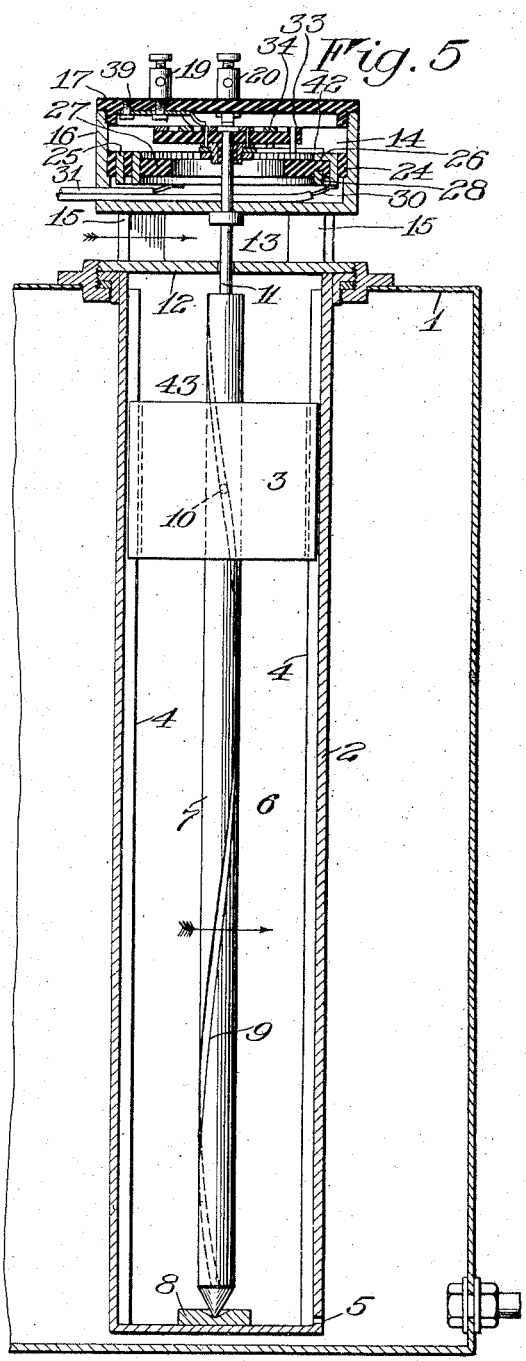
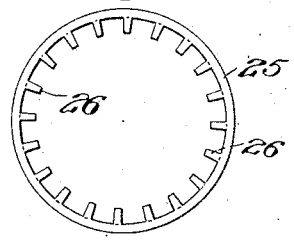
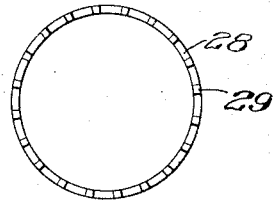
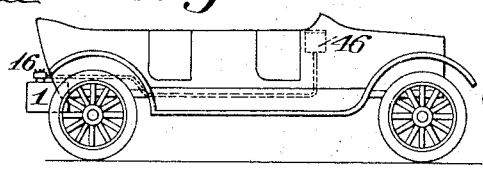
INVENTOR
Adolph Stuber
BY
his ATTORNEYS

UNITED STATES PATENT OFFICE.

ADOLPH STUBER, OF ROCHESTER, NEW YORK.

APPARATUS FOR REGISTERING THE FLOW OF LIQUID.

1,387,022.

Specification of Letters Patent.

Patented Aug. 9, 1921.

Application filed November 8, 1916. Serial No. 130,154.

*To all whom it may concern:*

Be it known that I, ADOLPH STUBER, of Rochester, in the county of Monroe and State of New York, have invented certain new and useful Improvements in Apparatus for Registering the Flow of Liquid; and I do hereby declare the following to be a full, clear, and exact description of the same, reference being had to the accompanying drawings, forming a part of this specification, and to the reference characters marked thereon.

My invention relates to an apparatus for registering the flow of liquid and is designed particularly for indicating the amount of fuel fed to a liquid fuel consuming element from the supply source thereof and the amount remaining at the source from time to time. A further object of the invention is to provide a liquid fuel registering mechanism for automobiles and other vehicles upon which explosion motors are used for indicating to the driver of said vehicles the amount of liquid fuel fed from the supply source to the motor thereof and the amount remaining at the source from time to time, said mechanism being electrically operated and controlled by other mechanism, the operation of which is dependent upon the rise and fall of the liquid at said source. A still further object of the invention is to provide an electrically operated registering mechanism controlled by an electric switch arranged to be actuated by a float in a liquid fuel container, the switch being so positioned with respect to said container as to provide an air-gap between the two to prevent ignition of any evaporated particles of the liquid fuel from the container for the purpose of obviating explosions. To these and other ends the invention consists in certain improvements and combinations of parts all as will be hereinafter more fully described, the novel features being pointed out in the claims at the end of the specification.

In the drawings:

Fig. 5 is a sectional elevation through the float chamber and circuit controlling mechanism connected therewith;

Fig. 6 is a detail plan of the outer contact ring shown in section in Fig. 5;

Fig. 7 is a similar view of the inner contact ring also shown in Fig. 5.

Fig. 8 is an enlarged detail sectional view through a portion of the float operated circuit controlling mechanism, and Fig. 9 is a view showing the application of the invention to a motor driven vehicle.

Similar reference characters throughout the several views indicate the same parts.

Figure 1:
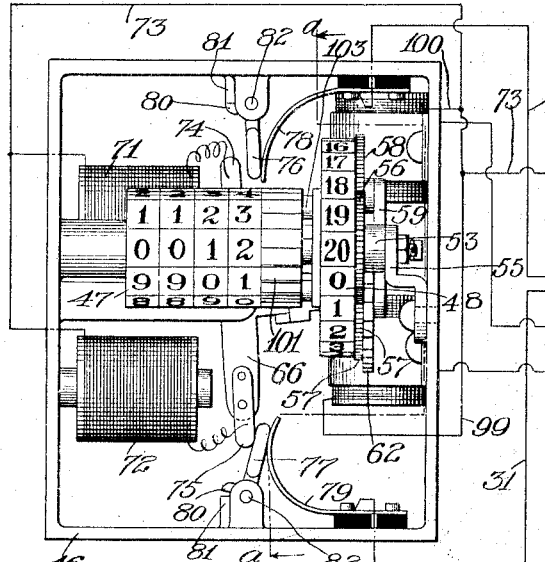
Figure 1 is a plan view showing the registering and circuit controlling mechanism electrically connected, with the latter shown in section.

The present invention embodies a liquid fuel registering device which is designed especially for use on automobiles and other motor driven vehicles to enable the drivers of the vehicles to determine at a glance the amount of fuel consumed by the motors and the amount remaining in the supply tanks from time to time. The registering mechanism is preferably positioned on the dashboard of the machine where it can be viewed by the driver without leaving his seat, while the controlling means for the registering mechanism is connected with the fuel supply tank at the rear of the machine or at whatever point said tank may be positioned.

It will be understood that the invention is readily applicable to a stationary liquid fuel consuming engine as well as to a motor driven vehicle and is particularly adaptable for use in determining at the point where the attendant of such an engine is stationed, the amount of fuel consumed by the engine and the amount remaining at the source of supply which may be located at some distance from said engine.

The invention comprises broadly two separate mechanisms electrically connected, one constituting the liquid fuel registering mechanism and the other the circuit controlling mechanism or switch for opening and closing the electric circuit connecting the two, whereby the operation of the former is effected by the latter for each predetermined unit of liquid fuel consumed by the motor.

Referring to the drawings by numerals, 1 represents the liquid fuel supply tank of an automobile or other motor driven vehicle with which is connected, preferably by insertion therein, a float containing receptacle 2 in which a float 3 is free to move up and down upon guides 4 located on the inner walls of the receptacle. At the bottom of the container through the vertical wall thereof is formed an aperture 5 preferably of relatively small diameter through which the liquid fuel in the tank 1 is admitted to the float chamber 6 to elevate said float when the tank is filled. The aperture 5 is made small for the purpose of preventing undue movement of the liquid in the float chamber when the machine is traveling over rough roads. Extending through the float is a switch operating shaft 7, the bottom end of which is preferably pointed and seated on a bearing 8 supported by the bottom of the receptacle 2. The shaft 7 is provided with a spiral groove 9 in which operates a pin 10 rigidly connected with the float 3 so that upward movement of the float will cause the shaft to rotate in one direction while downward movement of said float will cause said shaft to rotate in a reverse direction. The top of the shaft 7 is provided with a reduced extension 11 arranged to extend through the screw cap or cover 12 of the receptacle 2 as shown in Fig. 5.

Spaced from the cover 12 to form an air-gap 13 is an electric switch 14 preferably supported on the cover by means of the uprights or standards 15 as shown. The switch 14 is electrically connected with the fuel registering device in a manner which will be presently explained.

The switch is preferably mounted in a circular casing 16 having a screw cap 17 formed of suitable insulating material upon which the binding posts 18, 19 and 20 are positioned to receive the conductors 21, 22 and 23 leading to the registering mechanism as shown in Fig. 1. Mounted in the casing 16 and spaced from the bottom thereof is an insulating ring 24 carrying a contact ring 25 provided with a series of inwardly extending spaced contact points 26. Mounted within the contact ring 25 is an insulating ring 27 arranged to insulate the inner contact ring 28 from the outer contact ring 25. The inner contact ring is provided with a series of upwardly projecting contact points 29 extending flush with and between the contact points 26 as shown in Figures 1 and 5.

Extending through the wall of the casing 16 and connected with the bottom of the outer contact ring 25 is a conductor 30 and in the same manner another conductor 31 is connected with the bottom of the inner contact ring 28. The opposite ends of these conductors are connected with the liquid fuel registering mechanism in a manner which will presently be explained. The movable parts of the switch 14 are mounted upon the upper end of the rotatable extension rod 11 carried by the shaft 7 and comprise an insulating disk 32 rigidly connected with said extension and arranged to be rotated thereby, the disk being provided upon its upper face with three concentric contact rings 33, 34 and 35, the ring 35 being at the center of the disk as shown in Fig. 1. The rings 33, 34 and 35 are engaged by the wipers 36, 37 and 38 respectively, as shown in Figs. 5 and 8, said wipers being secured upon the bottom face of the insulating screw cap 17 as shown. The binding posts 18, 19 and 20 are respectively connected with the wipers 36, 37 and 38 through the screw cap 17, said wipers being also connected with the screw cap by means of suitable screws 39. The inner contact ring 35 on the disk 32 is connected by means of suitable rivets 40 with a flanged sleeve 41 beneath the disk as shown in Figs. 5 and 8. The sleeve is insulated from the rod 11 and is arranged to receive the movable contact member or pointer 42 which is loosely mounted thereon and held by a suitable nut 43. The pointer extends between the downwardly projecting contact pins 44 and 45 connected with the rings 33 and 34 respectively, said pointer being normally in engagement with one of the pins and out of engagement with the other, it being understood that said pointer will be moved by one or the other of the pins, depending upon the direction of rotation of the disk on the shaft 7. Movement of the pointer in this manner will cause the same to alternately engage the contact points 26 and 29 on the outer and inner contact rings 25 and 28 respectively, the distance between said contact points being greater of course, than the width of the pointer to insure proper clearance of the one before contact is made with the other.

The registering mechanism which is mounted in the casing 46 is provided with a set of registering wheels 47 and also a registering wheel or counter 48, the latter of which is arranged to indicate the number of gallons or units of fuel in the tank 1, while the former indicates the number of gallons or units consumed by the motor or other liquid fuel consuming elements. The set of wheels or counter 47 comprising in the present instance four wheels, as shown in the drawing, Figs. 1 and 3, connected by the usual or any suitable transfer mechanism, such for example, as is well known in the art, is arranged to be operated by the counter 48 which is electrically controlled and operated by current furnished by a battery 49. The counters 47 and 48 are read through the windows 50 and 51 respectively, which are formed in the casing cover 52. As the transfer mechanism forms no part of the present invention, further illustration and description are not necessary.

Figure 2:
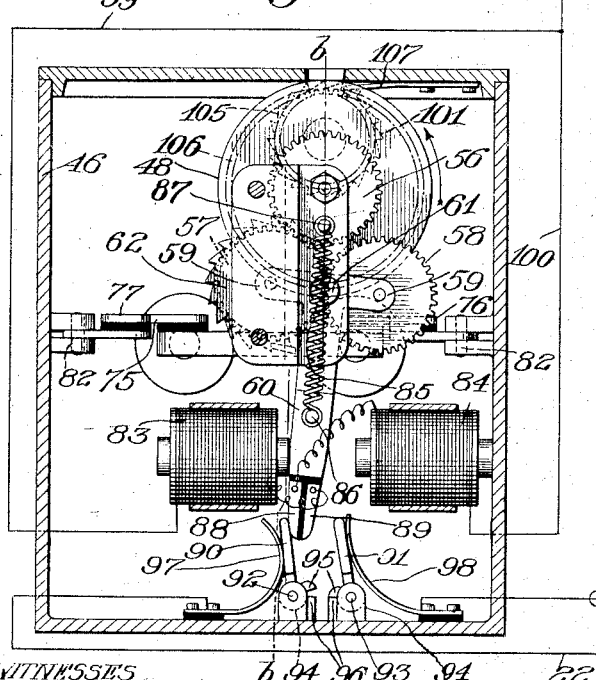
Fig. 2 is a sectional elevation taken on line *a—a* of Fig. 1.
Figure 4:
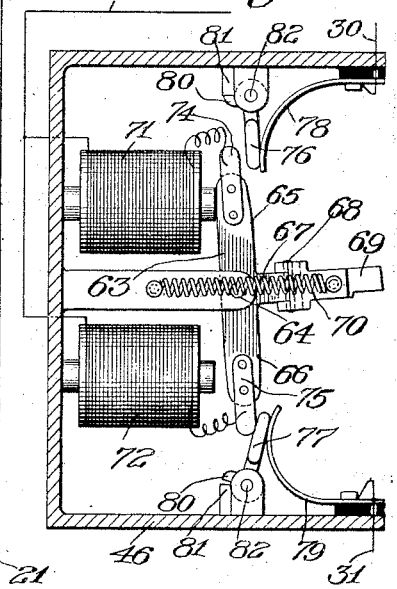
Fig. 4 is a sectional view taken on line *c—c* of Fig. 3.

The counter wheel 48 is provided with a hub 53 loosely mounted on a short shaft 54 supported by a bracket 55 carried by one of the side walls of the casing 46. Mounted on the hub 53 and rigidly connected therewith is a gear 56 arranged to drive the counter wheel 48, the gear 56 being driven in one direction while the tank is being filled and in an opposite direction when said tank is being emptied. The gear wheels 57 and 58 for alternately driving the gear 56 are arranged to mesh one with the other and are rotatably mounted on the arms 59 of an armature 60 pivotally mounted on a pin 61 carried by the bracket 55. One of the arms is also provided with a ratchet wheel 62 which is rigidly connected with the gear 57 shown in mesh with the gear 56 in Fig. 2. With the several gears in the positions shown in this figure the operation of the ratchet wheel 62 will drive the counter wheel 48 which will be driven backwardly from the position shown in Figs. 1 and 2, or in other words, from the position the counter moved to when the fuel tank was filled. Operation of the ratchet wheel 62 is effected by an armature 63 pivoted at 64 and provided with oppositely extending arms 65 and 66 having a central extension 67 upon which is pivoted at 68 a pawl 69 arranged to engage the teeth of the ratchet 62 as shown in Fig. 2, whereby movement of the pawl in one direction will advance the ratchet wheel a predetermined amount sufficient to cause the counter 48 to indicate either the addition to or discharge from the fuel tank of one unit of liquid fuel, an amount in the present instance preferably fixed at one gallon. Movement of the armature in an opposite direction will, of course, merely cause said pawl to move idly from one tooth of the ratchet to the next succeeding tooth or in position to again actuate said ratchet. The pawl being mounted on a horizontal pivot will, of course, yield or move downwardly at its outer end and pass idly over the teeth of the ratchet while moving in one direction, being held in contact with the ratchet by spring 70. However, as soon as it has passed over one or more of said teeth the spring 70 will maintain the pawl in position for engagement with the next succeeding tooth of the ratchet where it will be held ready to actuate said ratchet at the next operation of the armature. The spring 70 also serves to lightly hold the pawl 69 at one side or the other of the center of a pair of magnets 71 and 72 as shown in Fig. 4. The armature 63 is arranged to be moved in opposite directions by alternately energizing the magnets 71 and 72 which are controlled by the switch 14, being connected therewith through the conductor 23, battery 49, conductor 73 and through the insulated contact members 74 and 75 of the armature 63 which alternately engage the pivoted insulated contacts 76 and 77 respectively, in contact with the springs 78 and 79 which are connected with the switch by wires 30 and 31 respectively. The pivoted contacts 76 and 77 are actuated toward the magnets 71 and 72 by said springs as shown in Fig. 1, but are limited in their movement toward said magnets by the stops 80 which engage shoulders on the projections 81 upon which said contacts are pivoted as indicated at 82. The spring 78 is connected with the outer contact ring 25 of the switch 14 by means of the conductor 30, while the spring 79 is connected with the inner contact ring 28 by means of the conductor 31, the magnet 72 being in closed circuit when the pointer 42 is on one of the contact points 29 and the magnet 71 in closed circuit when said pointer is on one of the contact points 26.

In order to reverse the direction of rotation of the counter 48 from that indicated by the arrow in Fig. 2 it is necessary to disconnect the gear 57 from the counter operating gear 56 and cause the gear 58 to mesh with said operating gear whereby said counter may be rotated at the proper time in a reverse direction. The movement of the gears 57 and 58 into and out of mesh with the gear 56 is effected by the magnets 83 and 84 through the armature 60 which is attracted by one or the other of said magnets when they become energized. The armature when attracted by either one of said magnets is lightly held in contact therewith by the spring 85, one end of which is connected with a pin 86 on the armature and the other with a pin 87 on the bracket 55 at a point considerably above the pivot point 61 of said armature, so that the tension is increased upon the spring as it approaches the central point between the two magnets. The armature 60 carries two insulated contact members 88 and 89, the latter being connected with the magnet 83 while the former is connected with the magnet 84. The contact members 88 and 89 are adapted to engage the insulated contacts 90 and 91 respectively, pivoted at 92 and 93 upon the projections 94 and provided with stops 95 arranged to engage the shoulders 96 on said projections to limit the inward movement of the pivoted contacts 90 and 91 against the action of the contact springs 97 and 98 respectively. The contact spring 97 is connected with the binding post 19 of the switch 14 by means of the conductor 22, while the contact spring 98 is connected with the binding post 18 by means of the conductor 21 as shown in Figs. 1 and 2. The magnets 83 and 84 are connected with conductors 99 and 100 respectively, said conductors being connected with the conductor 73 leading to one side of the battery 49.

Figure 3:
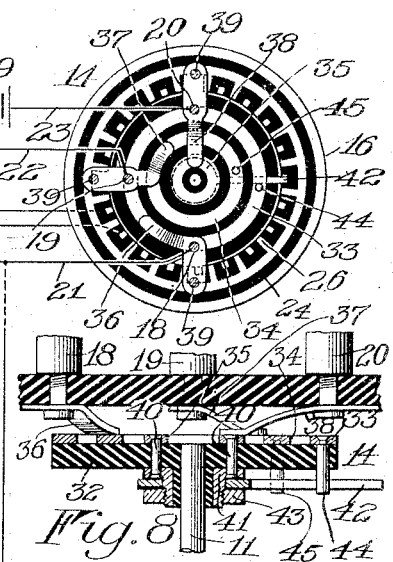
Fig. 3 is a sectional elevation taken on line *b—b* of Fig. 2.

The registering wheels 47 for totaling the number of gallons of fuel consumed by the engine of the vehicle are operatively connected with the ratchet 101 and are driven in a forward direction thereby, said ratchet being loosely mounted on the fixed shaft 102 and driven by the spring pressed plungers 103 which frictionally engage the disk 104 rigidly connected with the gear 105, also loosely mounted on the shaft 102, said gear meshing with the teeth 106 formed internally of the counter or registering wheel 48 as shown in Fig. 3, whereby upon rotation of said wheel 48 during the downward movement of the float 3 the gear 105 will be rotated to frictionally drive the counter operating ratchet. However, during the upward movement of the float 3 and rotation of the registering wheel 48 in a reverse direction the ratchet 101 will be prevented from rotating backwardly by the dog 107 engaging the teeth of the ratchet as shown in Fig. 2.

It will be understood that when the tank, which is preferably designed to hold twenty gallons, has been filled, the float 3 will be supported at or near the top of the cylinder 2 by the liquid therein which is admitted through the aperture 5. With a full tank the registering wheel 48 will stand at "20" as shown in Fig. 1 and upon downward movement of the float the pointer 42 will be engaged by the pin 44 of the contact ring 33 as the shaft 7 begins to rotate in the direction indicated by the arrow in Fig. 5. The pin 44 will remain in contact with the pointer 42 until the tank is empty at which time the float will be at the bottom of the cylinder 2. When a new supply of liquid fuel is poured into the tank and the float begins to be elevated the direction of rotation of the shaft 7 will, of course, be reversed and likewise the direction of rotation of the disk 32, at which time the pin 45 of the contact ring 34 will be moved into contact with the pointer 42 to move the same in an opposite direction from that in which it was previously moved. As the pin 45 is moved into contact with said pointer the pin 44 will, of course, be moved out of contact therewith. Upon connection of the pin 45 with said pointer current will flow from the battery through conductor 23, wiper 38, contact rings 35 and 34, wiper 37, conductor 22, spring 97, contacts 88 and 90, magnet 84, conductor 100 and back to battery, thus energizing said magnet to attract the armature 60 for the purpose of shifting the gear 58 into mesh with the gear 56 to reverse the direction of operation of the registering wheel 48. Thus it will be seen that each time the direction of rotation of the shaft 7 is reversed by movement of the float in opposite directions one or the other of the magnets 83 and 84 will be energized to attract the armature 60 and shift the gears 57 and 58.

While the tank is being filled or emptied rotation of the shaft 7 will cause rotation of said pointer and each time the contact is made between the pointer and one of the contacts 29 on the inner contact ring 28 current will flow from battery through conductor 23, wiper 38, contact ring 35, pointer 42, contact ring 28, conductor 31, contacts 79, 77 and 75, magnet 72, conductor 73 and back to battery, thus energizing said magnet to attract the arm 66 of the armature 63 for the purpose of causing the pawl 69 to operate the ratchet 62 to effect movement of the registering wheel 48 for indicating the consumption of a gallon or unit of gasolene by the motor of the vehicle. In a similar manner when the pointer 42 contacts with one of the contact points 26 on the outer contact ring 25 the other magnet 71 will be energized to attract the arm 65 of the armature 63 and thus move the pawl 69 into operative engagement with the next succeeding tooth on the ratchet 62. Rotation of the registering wheel 48 is thus kept up until the supply tank is empty. In filling the tank the operation of the mechanism is the same except that the direction of rotation of the parts is reversed.

I claim as my invention:

1. An apparatus for registering the flow of liquid comprising a liquid holding receptacle, a float therein, a rotatable member arranged to be rotated in one direction by upward movement of the float and in an opposite direction by downward movement of said float, an electric switch having contacts opened and closed by the action of said rotatable member in either direction, a registering member movable in opposite directions, a gear for actuating the same, a pair of shiftable gears for actuating said last mentioned gear, electrically controlled mechanism operatively connected with said shiftable gears and independent electrically controlled mechanism for effecting the shifting of said gears upon the reverse of said float, said electrically controlled operating mechanism being adapted to be controlled by said switch.

2. An apparatus for registering the flow of liquid comprising an electric switch, a registering member, an armature operatively connected with said registering member, spaced contacts adjacent said armature arranged to be alternately engaged by the latter, electromagnets having windings one end of each of which is connected with said armature, conductors connecting the last mentioned contacts and the other ends of said windings with said switch, the latter being arranged to alternately close the circuit through each of said magnets and said armature for the purpose of effecting movement of the armature in opposite directions whereby said registering member is moved to indicate the units of liquid discharged from the container.

3. An apparatus for registering the flow of liquid comprising an electric switch, a registering member movable in opposite directions, a driving gear connected therewith, an armature, a pair of intermeshing pinions carried by said armature one of which normally engages the driving gear, means controlled by the switch for effecting movement of the armature in opposite directions to alternately shift the pinions into and out of engagement with the driving gear, and means controlled by said switch for effecting rotation of one of the pinions.

4. An apparatus for registering the flow of liquid comprising a switch, a registering member having a gear for operating it, a pivoted armature, intermeshing pinions thereon arranged to alternately mesh with said gear, electro-magnetic devices controlled by said switch adapted to shift the pinions carried by the armature into and out of engagement with the gear, a ratchet connected with one of the pinions, a second pivotally mounted armature, a spring controlled pawl carried by said armature for rotating the ratchet when moved in one direction and riding over the teeth of the ratchet when moved in the opposite direction, and electro-magnetic devices for actuating said last mentioned armature.

ADOLPH STUBER.